(12) United States Patent
Bruzzone (10) Patent No.: US 6,424,839 B1
(45) Date of Patent: Jul. 23, 2002

(54) MOBILE COMMUNICATION (75) Inventor: Raul Bruzzone, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/335,017

(22) Filed: Jun. 17, 1999

(30) Foreign Application Priority Data

Jun. 23, 1998 (FR) ............................. 98 07916

(51) Int. Cl.$^7$ ................................. H04Q 7/20
(52) U.S. Cl. ................ 455/456; 455/435; 455/444; 455/552
(58) Field of Search ............... 455/456, 457, 455/414, 411, 420, 419, 435, 404, 516, 550, 552, 68, 527, 528, 88, 444

(56) References Cited

U.S. PATENT DOCUMENTS

| | | | |
|---|---|---|---|
| 5,442,805 A | * 8/1995 | Sagers et al. | ............... 455/456 |
| 5,613,213 A | * 3/1997 | Naddell | ............... 455/414 |
| 5,678,182 A | 10/1997 | Miller et al. | ............... 445/33.1 |
| 5,678,194 A | * 10/1997 | Grube et al. | ............... 701/207 |
| 5,857,155 A | * 1/1999 | Hill et al. | ............... 455/456 |
| 5,940,764 A | * 8/1999 | Mikami | ............... 455/456 |
| 6,011,973 A | * 1/2000 | Valentine et al. | ............... 455/456 |
| 6,085,096 A | * 7/2000 | Nakamura | ............... 455/456 |
| 6,122,486 A | * 9/2000 | Tanaka et al. | ............... 455/68 |
| 6,188,883 B1 | * 2/2001 | Takemura | ............... 455/411 |
| 6,201,973 B1 | * 3/2001 | Kowaguchi | ............... 455/456 |

FOREIGN PATENT DOCUMENTS

| | | | |
|---|---|---|---|
| EP | 0603049 A1 | 6/1994 | ............ H04Q/7/04 |
| EP | 0749254 A1 | 12/1996 | ............ H04Q/7/22 |
| WO | WO9719570 | 5/1997 | |

OTHER PUBLICATIONS

By Philips, Users Manual of "FIZ" Mobile Telephone, pp. 1–45.

* cited by examiner

Primary Examiner—Edward F. Urban
Assistant Examiner—Charles Craver
(74) Attorney, Agent, or Firm—Dicran Halajian (57) ABSTRACT

A mobile communication apparatus (MCA) comprises a memory (MEM) for storing data (CDATA) relating to the coverage area (COV) of a mobile communication standard according to which the mobile communication apparatus can operate. The mobile communication apparatus (MCA) includes an interface (INT) for taking data (PDATA) from the exterior which data relate to the geographical location (LOC). The mobile communication apparatus includes an indicator (IND) for indicating whether the mobile communication apparatus can be used or not (U: Y/N) based on data (CDATA) relating to the geographical zone and data (PDATA) relating to the geographical location. Such an indication makes it possible for the user to deduce whether, in the case where he is unsuccessful in establishing a communication, a displacement in the proximity will help him to establish the communication. Besides, the indication whether the apparatus can be used or not may be produced in a relatively short period of time. Thus, the mobile communication apparatus (MCA) described above provides better user satisfaction.

12 Claims, 5 Drawing Sheets

| 42 | | |
|---|---|---|
| GSM | RAS[0,1] | RAS[0,2] |
| DCS-1800 | RAS[1,1] | RAS[1,2] |
| AMPS | RAS[2,1] | RAS[2,2] |
| IS-136 | RAS[3,1] | RAS[3,2] |
| IS-95A | RAS[4,1] | RAS[4,2] |
| PDC | RAS[5,1] | RAS[3,2] |
| PCS-1900 | RAS[6,1] | RAS[6,2] |
| UMTS-FDD | RAS[7,1] | RAS[7,2] |
| UMTS-TDD | RAS[8,1] | RAS[8,2] |
| IMT-2000/1 | RAS[9,1] | RAS[9,2] |
| IMT-2000/2 | RAS[10,1] | RAS[10,2] |
| ⋮ | ⋮ | ⋮ |
| --- | RAS[N,1] | RAS[N,2] |

FIG. 5

| 44 | |
|---|---|
| PD [1] | VAL [1] |
| PD [2] | VAL [2] |
| PD [3] | VAL [3] |
| PD [4] | VAL [4] |
| PD [5] | VAL [5] |
| ⋮ | ⋮ |
| PD [K] | VAL [K] |

MOBILE COMMUNICATION

FIELD OF THE INVENTION

The invention relates to mobile communication such as, for example, mobile telephony.

BACKGROUND OF THE INVENTION

The User Guide of the "Fizz" mobile telephone marketed by Philips, contains the following remarks in the part "Optimum use of the telephone" on page 22. If there is no reception, the two symbols indicating reception do not appear and the message "no network" is displayed. You may be in an area where the reception is particularly poor (in a tunnel or behind a very tall building, for example). Change your position and try again.

SUMMARY OF THE INVENTION

It is an object of the invention to provide better user satisfaction for a user of a mobile communication apparatus.

The invention takes the following aspects into consideration. If a mobile communication apparatus cannot be used at a certain place, this may be due to the fact that communication signals are too weak caused by the surroundings. In that case, the user may change position as suggested by the document cited above, until he finds himself in surroundings which do not weaken the communication signals too much. However, it is also possible that there are no communication partners sufficiently near, such as, for example, a base station operating according to the same mobile communication standard as the apparatus. In the latter case, the user would change position in vain one or several times until he gets tired of changing position.

According to one aspect of the invention, a mobile communication apparatus comprises a memory for storing data relating to the coverage area of a mobile communication standard according to which the mobile communication apparatus can operate. The mobile communication apparatus includes an interface for taking from the exterior data relating to the geographical location. The mobile communication apparatus includes an indicator indicating whether the mobile communication apparatus can be used or not, based on data relating to the coverage area and data relating to the geographical situation.

Let us suppose that such a mobile communication apparatus indicates that it can be used, whereas the user who is at a certain place is unsuccessful in establishing a communication. This indication makes it possible for the user to know that it may be sufficient to change position to establish a communication. On the other hand, if the apparatus indicates that it cannot be used, this makes it possible for the user to know that it is generally no use changing position or even trying to establish a communication. Consequently, the invention makes it possible to reduce the number of useless moves with the object of establishing a communication, or even to avoid such moves. Thus, the invention makes it possible to provide better user satisfaction.

Another reason for which the invention makes it possible to provide better user satisfaction is linked with the following aspects. Data relating to the geographical location may be taken from the exterior with a relatively short delay. For example, they may be taken from the exterior by a receiver that receives signals of the "Global Positioning System" (GPS) and derives geographical co-ordinates therefrom. This may take place in a relatively short period of time. To indicate whether the mobile communication apparatus can be used or not, it is sufficient to read from the memory the data that relate to the geographical location by deriving a conclusion therefrom. This may take place in a relatively short period of time, for example, by using a sufficiently powerful processor. Thus, the invention makes it possible for the user to know in a relatively short period of time whether the mobile communication apparatus can be used or not. This forms another reason for which the invention provides better user satisfaction.

According to another aspect of the invention, a transmission system comprises data relating to the coverage area of a mobile communication standard. This makes it possible for a mobile communication apparatus defined above to receive such a signal and substitute the transmitted data for the data relating to the coverage area which have previously been stored in the memory. The transmitted data may include a change of coverage area which was not included in the data previously stored in the memory. Thus, the signal defined above makes it possible to update data relating to the coverage area of a mobile telephony standard. Thus, the present aspect of the invention contributes to indicating in a sufficiently exact manner whether the mobile communication apparatus can be used or not.

BRIEF DESCRIPTION OF THE DRAWINGS

These and other aspects of the invention will be apparent from and elucidated with reference to the embodiments described hereinafter.

In the drawings.

DESCRIPTION OF THE EMBODIMENTS

The following remarks relate to reference signs. Like entities are designated by like letter references in all the Figures. Several similar entities may appear in a single Figure. In that case, a digit or a suffix is added to the letter reference in order to distinguish between like entities. The digit or the suffix may be omitted for convenience or it may be replaced by an asterisk in the case where its value is not important (do not care value). This applies to the description as well as the claims.

Figure 1:
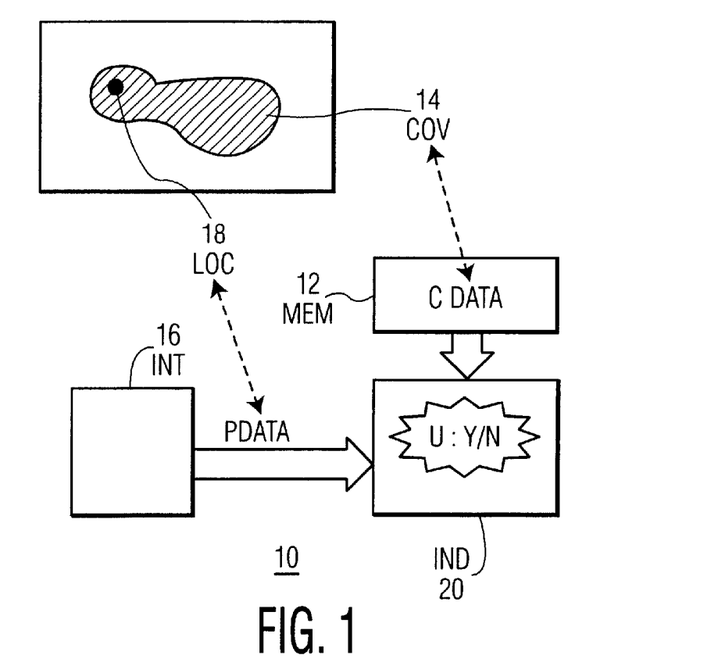
FIG. 1 is a conceptual diagram illustrating basic features of the invention as defined in the first claim.

FIG. 1 illustrates basic features of the invention. A mobile communication apparatus 10 comprises a memory 12 for storing data CDATA relating to the coverage area 14 of a mobile communication standard according to which the mobile communication apparatus can operate. The mobile communication apparatus 10 includes an interface 16 for taking from the exterior data PDATA relating to the geographical location 18 of the mobile communication apparatus 10. The mobile communication apparatus 10 includes an indicator 20 for indicating whether the mobile communication apparatus can be used or not, U: Y/N, based on data CDATA relating to the coverage area and data PDATA relating to the geographical location.

The following aspects have been taken into consideration for utilizing the features illustrated by FIG. 1. In principle, it is possible to organize the data CDATA relating to the coverage area 14 in the following manner. A geographical range, for example, the whole world or part of the world, is fictitiously subdivided into geographical zones having substantially the same size. The data CDATA contain for each geographical zone an element that indicates whether the mobile communication standard is applied or not in this zone, for example, by giving the element a binary 0 or 1 value.

In practice, the coverage area 14 of a mobile communication standard will have a limit situated in certain geographical zones. An element associated to such a geographical zone will give an erroneous indication: the element will indicate either that the standard is applied in the whole zone, or that the standard is not applied in the whole zone, whereas neither is correct. Thus, the data CDATA relating to the coverage area will be partly erroneous. The geographical zones into which the geographical range is subdivided are smaller, and so is the erroneous part of the data CDATA relating to the coverage area 14. However, the smaller the geographical zones are, the larger the number of elements of the data CDATA will be that relate to the coverage area 14 and, consequently, the larger the memory 12 will be. Thus, there is a compromise between the exactness of the data CDATA relating to the coverage area 14 and the size of the memory 12 in which the data CDATA are stored. It is probable that, if the data CDATA are to cover a sufficiently wide geographical range and at the same time be relatively exact, the elements will be so numerous that the memory 12 will be too expensive for certain applications, notably applications for the general public.

Figure 2:
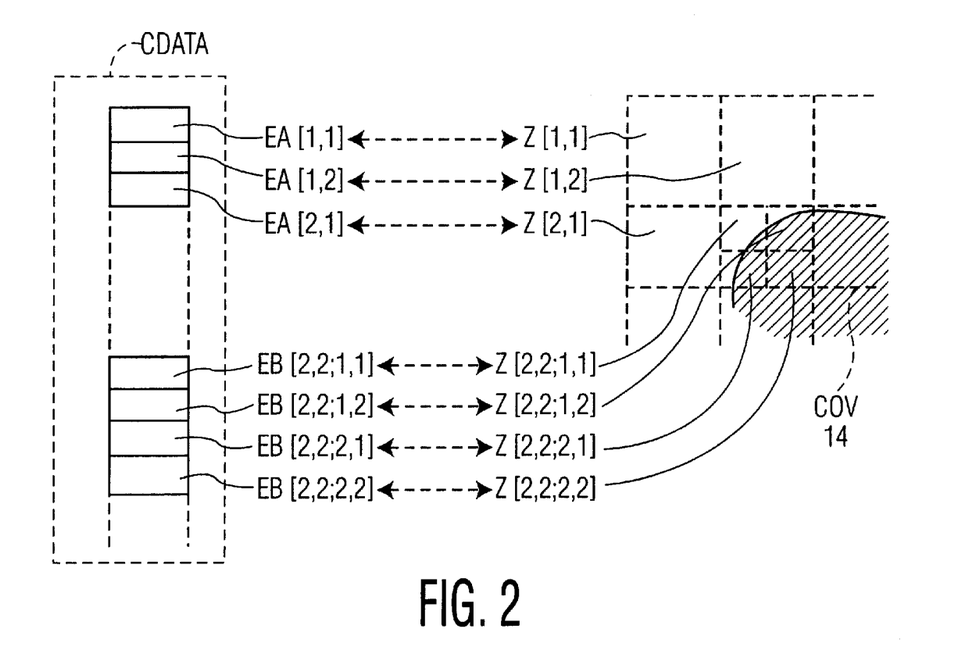
FIGS. 2 and 3 are conceptual diagrams illustrating additional features as defined in the second and third claim, respectively.

FIG. 2 illustrates the following features. The data CDATA relating to the coverage area 14 contain various types of elements EA, EB. Each element EA, EB is associated to a specific geographical zone Z whose size depends on the type of element EA, EB.

The features illustrated in FIG. 2 produce the following advantageous effects. For geographical locations which are relatively close to the boundary of a coverage area 14, the area may be described by elements of the type EB which are associated to relatively small geographical zones Z[*,*;*,*]. Thus, the data CDATA describe with relatively great exactness the coverage area 14. For geographical locations which are relatively far from the boundary of the coverage area 14, the area may be described by elements of the type EA which are associated to relatively wide geographical zones Z[*,*]. Thus, the data CDATA may describe the coverage area 14 with relatively few elements. Thus, the features illustrated in FIG. 2 make it possible to describe a coverage area 14 with a satisfactory exactness without the memory 12 which stores the data CDATA relating to the coverage area 14 becoming too large. Thus, the features illustrated in FIG. 2 contribute to implementing the invention in an economical manner.

The following aspects have been taken into consideration for implementing the features illustrated by FIGS. 1 and 2. There are various ways of finding the element(s) EA, EB among the data relating to the coverage area CDATA, which element(s) relates(relate) to the geographical location 18. For example, each element EA, EB may comprise a description of the geographical zone Z to which the element applies. In that case, a sequential search may be made based on descriptions for finding the relevant element(s) EA, EB. However, this method is relatively complex and, consequently, runs the risk of taking relatively much time.

Figure 3:
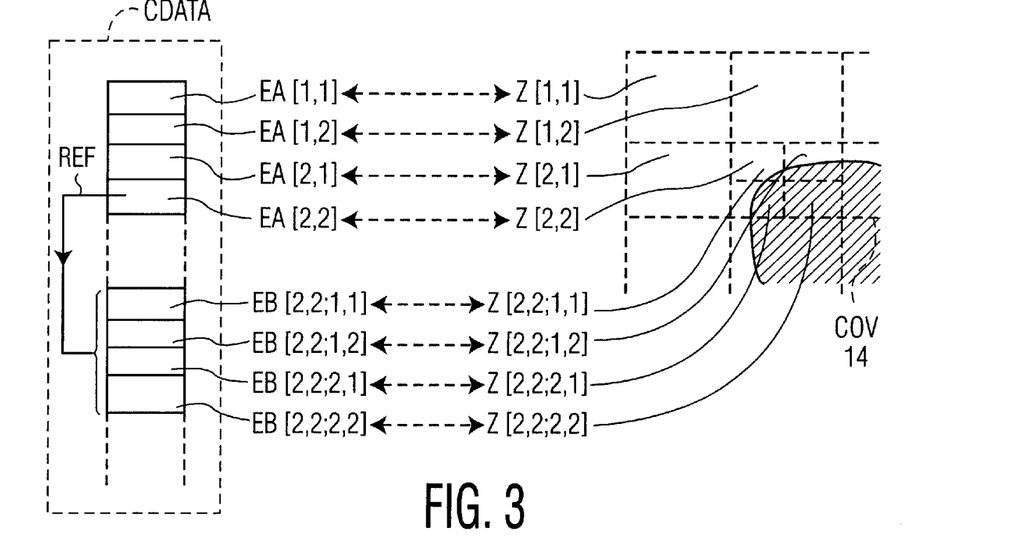

FIG. 3 illustrates the following features. An element EA[2,2] of one type refers REF to a group of elements EB[2,2;*,*] of another type. The elements EB[2,2;*,*] of the referenced group are associated to geographical zones Z[2, 2;*,*] which, in a combination, substantially correspond to the geographical zone Z[2,2] which the element EA[2,2] that forms the reference is associated to.

The features illustrated in FIG. 3 make it possible to apply the following method. Among the elements EA associated to the geographical zones Z[*,*] which are relatively wide, the element is selected that relates to the geographical location 18. This selection is made from relatively few elements and, consequently, it is relatively simple and fast. In the case where the coverage area 14 does not cover the geographical zone Z[*,*] associated to the selected element EA, this element EA indicates that the part in question is not applied. On the other hand, if the coverage area 14 at least partly covers this geographical zone Z[*,*], the selected element EA refers to the elements EB which describe in more detail the respective part of the coverage area 14.

Then, from the elements referenced EB, the element EB is selected that relates to the geographical location 14. Similar to the selection made earlier, this latter selection is relatively simple and fast, because it is made from relatively few elements. Thus, one or various other selections may be made until the relevant element is found that is associated to the smallest geographical zone. Thus, the features illustrated in FIG. 3 make it possible to apply a method that contributes to indicating in a relatively short period of time whether the mobile communication apparatus can be used or not.

Figure 4:
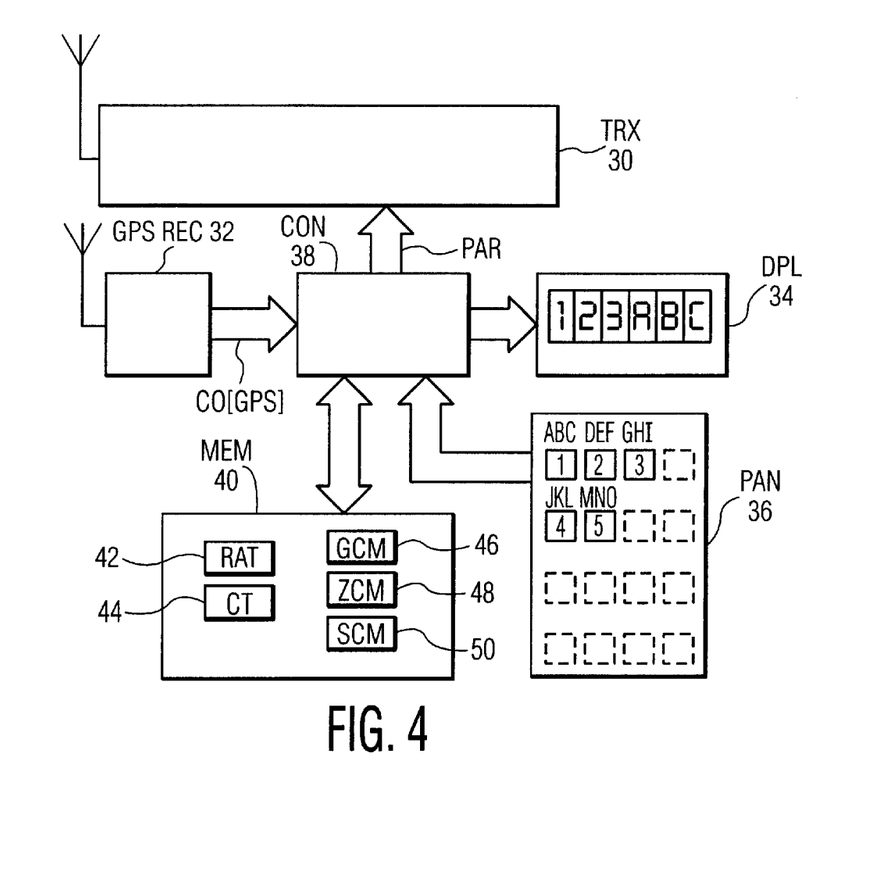
FIG. 4 is a block diagram illustrating an example of a mobile telephone according to the invention.

FIG. 4 illustrates an example of a mobile telephone according to the invention which goes back to the features illustrated in FIGS. 1, 2 and 3. The mobile telephone is capable of operating according to various mobile telephony standards such as, for example, the standards known by the abbreviations GSM, DCS-1800 and AMPS.

The mobile telephone illustrated by FIG. 4 comprises a transceiving circuit 30 for mobile communications, a receiver 32, a display 34, a control panel 36, a controller 38 and a memory 40. The transceiving circuit 30 performs the operations necessary for establishing a communication link with a base station by radio channel. The receiver 32 receives signals GPS and derives therefrom geographical co-ordinates of the geodetic type CO[GPS]. The control panel 36 makes it possible for the user to dial control words. The display 34 displays alphabetic and digital characters informing the user of the state of the mobile telephone. The controller 38 supplies parameter signals PAR to the transceiving circuit 30 which signals permit of adapting this circuit to one of various mobile telephony standards. Moreover, the controller 38 sends display signals to the display 34 and receives control signals from the control panel 36.

The memory 40 contains various types of data which make it possible for the mobile telephone to carry out different functions. The memory 40 contains, inter alia, a radio access table 42 which forms a list of various mobile telephony standards according to which the mobile telephone illustrated in FIG. 4 can operate. For each mobile telephony standard the memory 40 contains a configuration table 44, a global coverage matrix 46 and one or various zone coverage matrices 48 and one or various square coverage matrices 50. The two types of table 42, 44 and the three types of matrices 46, 48, 50 are described below in more detail.

Figure 5:
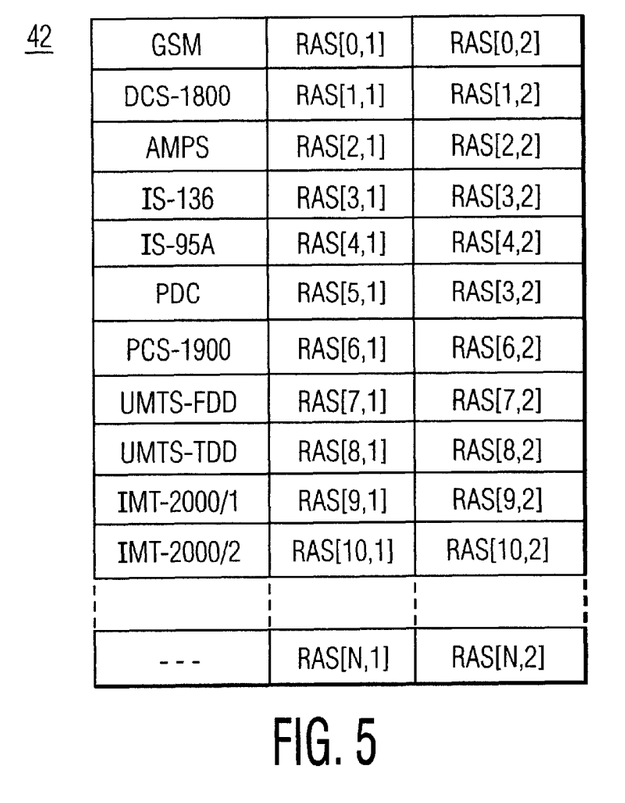
FIG. 5 illustrates a radio access table contained in the memory of the mobile telephone illustrated in FIG. 4.

FIG. 5 illustrates an example of the radio access table 42 stored in the memory 40. The table comprises three columns and rows whose number N corresponds to the number of the various standards according to which the mobile telephone can operate. The left column contains descriptions of the mobile telephony standards. The columns in the middle and on the right contain pointers RAS which point respectively at the configuration tables 44 and global coverage matrices 46. Each row belongs to a mobile telephony standard. Thus, each row contains a description of the mobile telephony standard to which it belongs, a pointer RAS[*,1] which points at a configuration table 44 belonging to the standard, and a pointer RAS[*,2] which points at a global coverage matrix 46 belonging to the standard.

Figure 6:
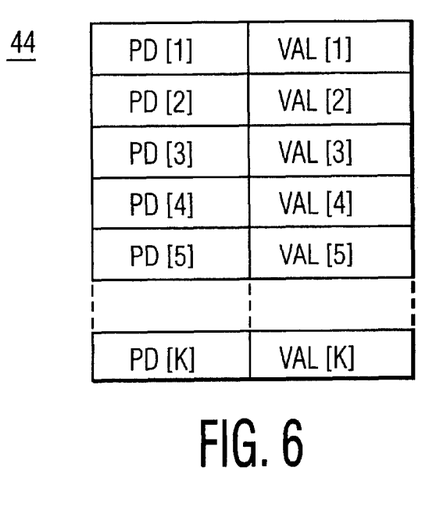
FIG. 6 illustrates a configuration table contained in the memory of the mobile telephone illustrated in FIG. 4.

FIG. 6 illustrates an example of a configuration table 44. The configuration table 44 contains two columns and rows whose number K corresponds to the number of the various parameters for configuring the transceiving circuit TRX according to a mobile telephony standard. The left column contains descriptions of parameters PD and the right column contains parameter values VAL for configuring the transceiving circuit 30 according to the standard. Each row belongs to a different parameter PD. Thus each row contains a description PD of the parameter to which it belongs and the value VAL of the parameter.

For example, the configuration table 44 may comprise data as described below:

PD[1]=position of an antenna switch

VAL[L]=2

PD[2]=selection of an input filter for a high-frequency amplifier circuit;

VAL[2]=2;

PD[3]=selection of an output filter for the high-frequency amplifier circuit;

VAL[3]=2;

PD[4]=dividing factor of a divider that forms part of a first frequency converter;

VAL[4]=2018;

PD[5]=selection of a filter having a first intermediate frequency;

VAL[5]=2;

. . .

Figure 7:
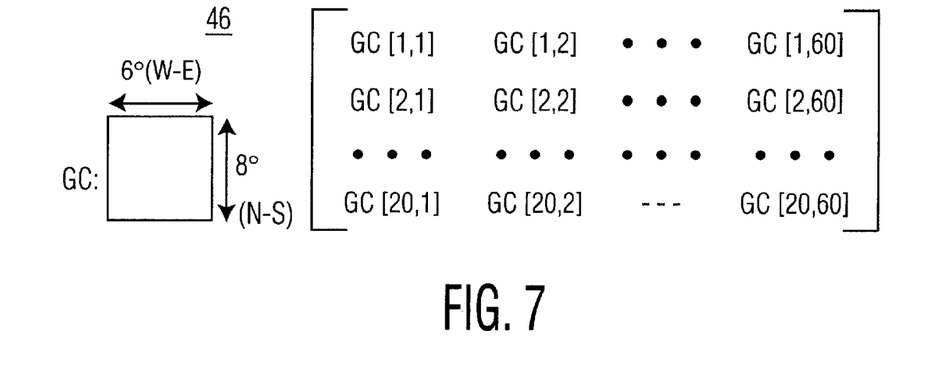
FIG. 7 illustrates a global coverage matrix contained in the memory of the mobile telephone illustrated in FIG. 4.

FIG. 7 illustrates an example of the global coverage matrix 46. The matrix 46 illustrated in FIG. 7 contains 60 columns and 20 rows and, consequently, 1200 elements GC. Each element GC is associated to a different geographical zone obtained by roughly dividing the surface of the earth according to the "Transversal Universal Mercator Projection" (MTUP). The MTUP projection is recommended by the International Association of Geodesy and Geophysics. A geographical zone obtained by this global division according to the MTUP projection has 6 degrees of longitude and 8 degrees of latitude.

Each element GC of the global coverage matrix 46 is a pointer. An element GC points at a zone coverage matrix 48 if, in the geographical zone to which the element GC is associated, the mobile telephony standard concerned is at least partly applied. This matrix 48 describes in more detail the availability of the mobile telephony standard in the geographical zone associated to the element GC. If, on the other hand, the mobile telephony standard is not applied in this geographical zone, the element GC points at a flag that indicates that the coverage area of the standard does not cover this geographical zone.

Figure 8:
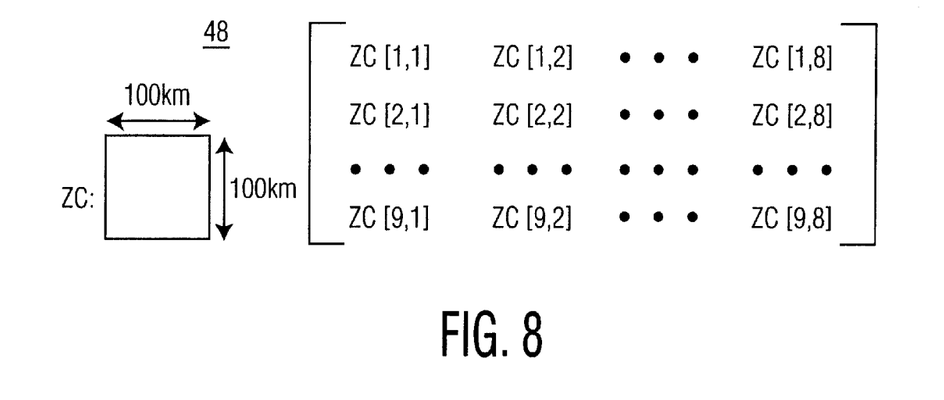
FIG. 8 illustrates a zone coverage matrix contained in the memory of the mobile telephone illustrated in FIG. 4.

FIG. 8 illustrates an example of a zone coverage matrix 48. The matrix 48 illustrated in FIG. 7 contains 8 columns and 9 rows and, consequently, 72 elements ZC. Each element ZC is associated to a different geographical zone. These geographical zones are obtained by dividing the geographical zone associated to element GC that refers to the matrix 48 into areas according to the MTUP projection. The geographical zones to which the elements ZC are associated form squares of 100 km by 100 km. It is to be noted that the number of elements ZC contained in a zone coverage matrix 48 may vary as a function of the element GC that forms the reference. This is due to the fact that the geographical zones to which the elements GC are associated do not all have the same size.

Each element ZC of the zone coverage matrix 48 is a pointer. An element ZC points at a square coverage matrix 50 if the mobile telephony standard concerned is at least partly applied in the geographical zone to which the element ZC is associated. This matrix 50 describes in more detail the availability of the mobile telephony standard in the geographical zone associated to the element ZC. If, on the other hand, the mobile telephony standard is not applied in this geographical zone, the element ZC points at the flag that indicates that the coverage area of the standard does not cover this geographical zone.

Figure 9:
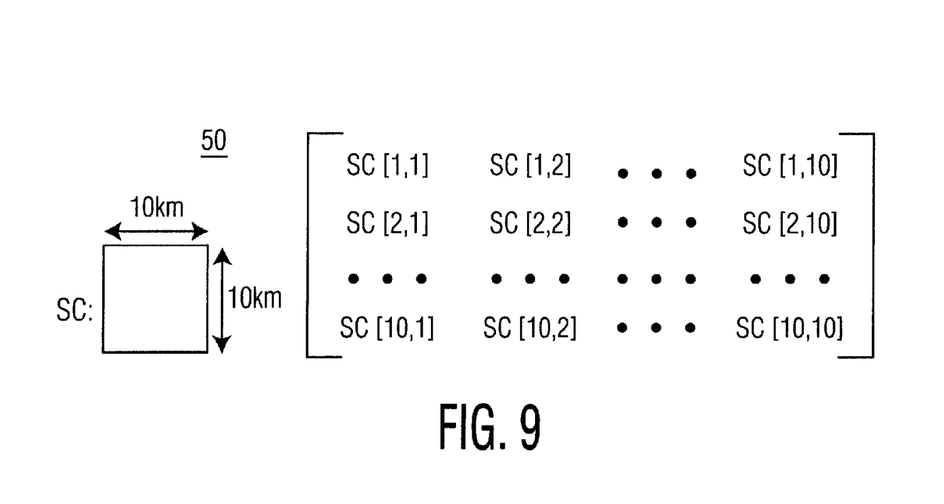
FIG. 9 illustrates a square coverage matrix contained in the memory of the mobile telephone illustrated in FIG. 4.

FIG. 9 illustrates an example of a square coverage matrix 50 to which an element ZC of a zone coverage matrix 48 may refer to. The matrix 50 illustrated by FIG. 9 contains 10 columns and 10 rows and, consequently, 100 elements SC. Each element SC is associated to a different geographical zone obtained by marking out in geographical zones of 10 km by 10 km the geographical zone associated to the element SC which refers to the matrix 50. Each element SC comprises an indicator bit whose value is 1 if the coverage area 14 of the mobile telephony standard covers at least part of the geographical zone associated to the element ZC. If not, the value of the indicator bit is 0.

Figure 10:
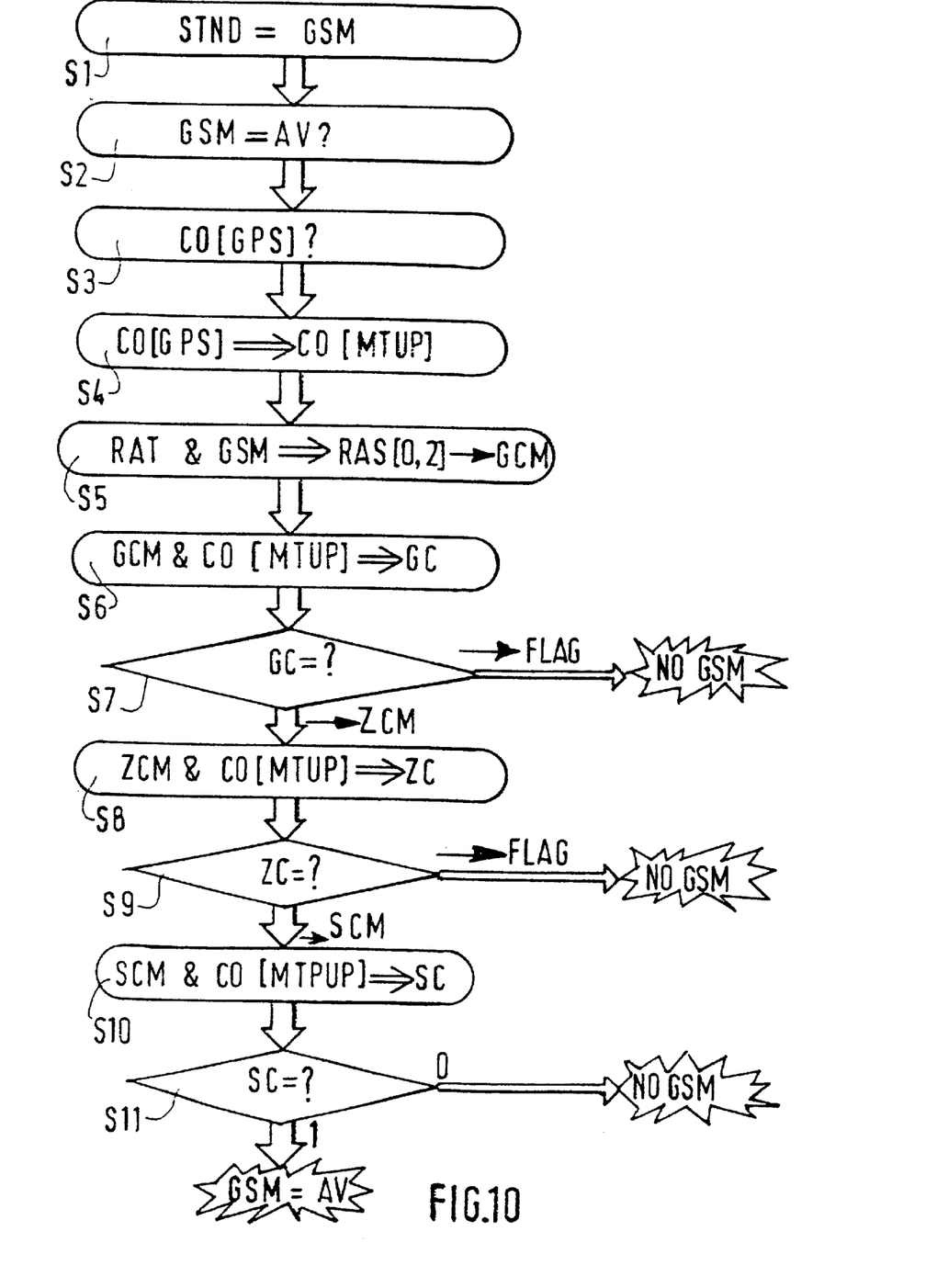
FIG. 10 is a flow chart diagram illustrating a method according to which the mobile telephone illustrated in FIG. 4 can operate.

FIG. 10 illustrates a way in which the mobile telephone illustrated in FIG. 4 may operate and of which the memory 40 contains tables and matrices illustrated in FIGS. 5 to 9. In a step S1, a user makes known to the controller 38 according to what mobile telephony standard the mobile telephone illustrated in FIG. 4 is to operate. The user may, for example, choose the GSM standard: STND=GSM, by way of the control panel 36. In a step S2, the user asks the mobile telephone to make known to him whether the GSM standard is applied or not: GSM=AV?. In response, in a step S3, the controller 38 receives from the receiver GPS the geodesic type of geographical co-ordinates CO[GPS] which define the geographical location of the mobile telephone. In a step S4, the controller 38 transforms the geodesic type of geographical co-ordinates CO[GPS] into geographical co-ordinates in accordance with the MTUP projection: CO[MTUP].

In a steps 5, the controller 38 selects, based on the radio access table RAT 42, the line belonging to the GSM standard including the pointer RAS[0,2] that points at the global coverage matrix GCM 46 belonging to the GSM standard. In a step S6, the controller 38 selects, based on this matrix GCM 46, the element GC associated to the geographical zone in which the mobile telephone is located. The controller selects the element GC based on the geographical co-ordinates CO[MTUP], for example, by transforming them into an address at which the element GC is stored. In a step S7, the controller 38 evaluates whether the element GC points at a zone coverage matrix ZCM 48 or at the flag FLAG indicating that the coverage area does not cover the geographical zone associated to the selected element GC. In the latter case, the controller 38 causes the display 34 to show that the mobile telephone cannot be used according to the GSM standard: NO GSM.

It is supposed that the selected element GC points at a zone coverage matrix ZCM 48. The consequence of this is that in a step S8 the controller 38 selects, based on this matrix ZCM 48, the element ZC associated to the geographical zone in which the mobile telephone is located. The controller selects the element ZC based on the geographical co-ordinates CO[MTUP], for example, by transforming them into an address at which the element ZC is stored. In a step S9, the controller 38 evaluates whether the selected element ZC points at a square coverage matrix SCM 50 or at the flag FLAG indicating that the coverage area does not cover the geographical zone associated to the selected element ZC. In the latter case, the controller 38 causes the display 34 to show that the mobile telephone cannot be used according to the GSM standard: NO GSM.

It is supposed that the selected element ZC points at a square coverage matrix SCM 50. The consequence of this is that, in a step S10, the controller 38 selects, based on this matrix SCM 50, the element SC associated to the geographical zone in which the mobile telephone is located. The controller selects the element SC based on the geographical co-ordinates CO[MTUP], for example, by transforming them into an address at which the element SC is stored. In a step S11 the controller evaluates the value of the indicator bit of the selected element SC. If the indicator bit of the element SC is 1, the controller 38 causes the display 34 to show that the mobile telephone can be used according to the GSM standard: GSM=AV. On the other hand, if the indicator bit is 0, the controller causes the display to show that the mobile telephone cannot be used according to the GSM standard: NO GSM.

If the indicator bit of the element SC is 1, a step takes place in which the controller 38 configures the transceiving circuit 30 according to the GSM standard by applying suitable parameter signals PAR thereto. In order for this to take place, the controller 38 receives the parameter values VAL contained in the configuration table CT belonging to the GSM standard. The controller CON selects this configuration table CT by using the pointer RAS[0,1] in the radio access table RAT 42. This pointer RAS[0,1] can be received at the same time as the pointer RAS[0,2] in the step S5 described above.

Preferably, the mobile telephone illustrated by FIG. 4 regularly updates the coverage matrices GCM 46, ZCM 48 and SCM 50. This may be effected via one or various information centers which keep a database updated, which database relates to the coverage areas of one or various mobile telephony standards. Preferably, this database contains coverage matrices which have the same format as those described above.

The mobile telephone illustrated in FIG. 4 may perform an update of the coverage matrices GCM 46, ZCM 48 and SCM 50 in the following manner. The mobile telephone regularly contacts an information center which keeps a database updated, which database relates to the coverage area of one or various standards. It verifies whether the coverage matrices GCM 46, ZCM 48 and SCM 50 are the latest version. In that case, the updating is terminated. If not, the mobile telephone replaces the elements of the coverage matrices GCM 46, ZCM 48 and SCM 50 which have been modified.

It is to be noted that there are numerous ways in which the mobile telephone can contact an information center. For example, the mobile telephone can contact an information center by radio channel while using the transceiving circuit 30. With respect to this, it is noted that various mobile telephony standards make it possible to establish dedicated data communications. For example, the GSM standard has a "Global Packet Radio System" which permits of a data communication having a rate of up to 115 kbits/s. The information center may be contacted, for example, via the internet.

As has already been set forth, the mobile telephone illustrated in FIG. 4 goes back to the features illustrated in the FIGS. 1, 2 and 3. As regards the features illustrated in FIG. 1, the following is found. The mobile telephone contains a memory 40 for storing matrices GCM 46, ZCM 48 and SCM 50 which together form the data relating to the coverage areas of the mobile telephony standards GSM, DCS-01800, AMPS, . . . according to which the mobile telephone can operate. The mobile telephone contains a receiver GPSREC which forms an interface for taking from the exterior geographical co-ordinates CO which form data relating to the geographical location of the mobile telephone. The mobile telephone contains a controller 38 and a display 34 which together form an indicator for indicating whether the mobile communication apparatus can be used or not based on data relating to the coverage areas and data relating to the geographical location.

As regards the features illustrated in FIG. 2, the following is found. The elements of the matrices GCM 46, ZCM 48 and SCM 50 form data relating to the various types of global coverage areas. Each element GC, ZC, SC of a matrix GCM 46, ZCM 48, SCM 50 respectively, is associated to a specific geographical zone whose size depends on the type of element GC, ZC or SC.

As regards the features illustrated by FIG. 3, the following is found. An element GC of a matrix GCM 46 refers to a matrix ZCM 48. The latter forms a group of elements ZC of another type than the type of element GC which forms the reference. The elements ZC of the matrix ZCM 48 to which is referred are associated to geographical zones which together substantially correspond to the geographical zone to which the element GC forming the reference is associated.

The above Figures and their descriptions illustrate the invention rather than limit the invention. It will be evident that there are countless alternatives having the spirit and scope of the appended claims. With regard thereto, several remarks are made in conclusion.

The functional entities or functions may be divided into numerous different manners. With regard thereto, it is to be noted that the Figures are highly diagrammatic, each Figure representing solely a single embodiment of the invention. Thus, although a Figure shows functional entities in separate blocks, this does not exclude all that various functional entities are present in a single physical entity.

Although FIG. 10 illustrates a method in which the user defines a desired standard, this does not exclude that a search of applied standards is made first, after which the standards are displayed so that the user can select the standard that is suitable to him. Alternatively, the selection of an applied standard may be effected automatically.

Although FIG. 10 illustrates a method in which a signal receiver GPS takes from the exterior data relating to the geographical location, this does not exclude other means for obtaining such data. For example, a mobile telephony standard by satellite may comprise means for localizing a mobile telephone, so that a satellite can point its antenna at the mobile telephone. Thus, such a mobile telephony system will know the geographical location of the mobile telephone. The latter may comprise a receiver for taking data relating to its geographical location from the satellite telephony system. In an alternative way, the data relating to the geographical location may be taken from the exterior via a keyboard which permits a user to make known to the apparatus the geographical location, for example, by keying in the name of a place. For example, while reference is made to the mobile telephone illustrated by FIG. 4, the control panel 36 may comprise such a keyboard and the controller 38 may translate the number of the place into geographical co-ordinates.

Finally, no reference sign in parentheses in a claim is to be interpreted as a limitation.

What is claimed is:

1. A method for determining availability of mobile telephony standards at specific geographical locations for a mobile communication device, said method comprising the steps of:
    (a) dividing a geographic area into a plurality of geographical zones;
    (b) mapping said geographical zones into data structures, elements of said data structures including availability indicators indicating whether specific mobile telephony standards are available for specific coverage areas;
    (c) storing said data structures relating to coverage areas of said mobile telephony standards for said geographical zones into memory of said mobile communication device;
    (d) acquiring external data relating to the geographical location of said mobile communication device;
    (e) comparing said acquired external data relating to the geographical location of said mobile communication device to said stored data structures relating to the coverage areas of said mobile telephony standards in order to determine availability of said mobile telephony standard in said geographical location;
    (f) indicating whether said mobile communication device can be utilized at a specific geographical location based on said acquired external data and said stored coverage area data;
    (g) selecting a mobile telephony standard; and
    (h) commencing communication using said mobile communication device according to a selected mobile telephony standard,
        wherein said storing step includes storing a first table that forms a list of various mobile telephony standards according to which the mobile communication device can operate.

2. The method of claim 1, wherein said geographical area is divided into a plurality of zones including first zones and second zones of smaller areas within said first zones, said mapping step including mapping said first and second geographic zones into corresponding separate data structures.

3. The method of claim 1, wherein said storing step includes storing a second table that includes parameter values for each mobile telephony standard, enabling for configuration of transceiving circuit.

4. The method of claim 1, wherein said storing step includes transmitting new information in order to update said stored coverage area data for said mobile telephony standards.

5. The method of claim 1, wherein said acquiring step comprises an interface for obtaining signals from a satellite communication system and deriving geographical coordinates therefrom.

6. A computer program device readable by machine, tangibly embodying a program of instructions executable by machine to perform method steps for determining availability of mobile telephony standards at specific geographical locations for a mobile communication device, said method comprising the steps of:
    (a) dividing a geographic area into a plurality of geographical zones;
    (b) mapping said geographical zones into data structures, elements of said data structures including availability indicators indicating whether specific mobile telephony standards are available for specific coverage areas;
    (c) storing said data structures relating to coverage areas of said mobile telephony standards for said geographical zones into memory of said mobile communication device;
    (d) acquiring external data relating to the geographical location of said mobile communication device;
    (e) comparing said acquired external data relating to the geographical location of said mobile communication device to said stored data relating to the coverage areas of said mobile telephony standards in order to determine availability of said mobile telephony standard in said geographical location;
    (f) indicating whether said mobile communication device can be utilized at a specific geographical location based on said acquired external data and said stored coverage area data;
    (g) selecting a mobile telephony standard; and
    (h) commencing communication using said mobile communication device according to a selected mobile telephony standard,
        wherein said storing step includes storing a first table that forms a list of various mobile telephony standards according to which the mobile communication device can operate.

7. A mobile communication device for detecting availability of mobile telephony standards at specific geographical locations comprising:
    (a) a memory for storing data relating to the geographical coverage areas of said specific mobile communication standards according to which said mobile communication device can operate, and for storing a first table that forms a list of various mobile telephony standards according to which the mobile communication device can operate;
    (b) a device for receiving external data relating to the geographical location of the mobile communication device;
    (c) a control panel for enabling user interactivity with said mobile communication device;
    (d) a transceiver for adapting said mobile communication device to one of said mobile telephony standards based on geographical location of said device for establishing a communication link with base station; and
    (e) a display for indicating availability of said mobile telephony standards.

8. A system for determining availability of mobile telephony standards at specific geographical locations for a mobile communication device, said system comprising:
    (a) means for dividing a geographic area into a plurality of geographical zones;

(b) means for mapping said geographical zones into data structures, elements of said data structures including availability indicators indicating whether specific mobile telephony standards are available for specific coverage areas;

(c) means for storing said data structures relating to coverage areas of said mobile telephony standards for said geographical zones into memory of said mobile communication device;

(d) means for acquiring external data relating to the geographical location of said mobile communication device;

(e) means for comparing said acquired external data relating to the geographical location of said mobile communication device to said stored data structures relating to the coverage areas of said mobile telephony standards in order to determine availability of said mobile telephony standard in said geographical location;

(f) means for indicating whether said mobile communication device can be utilized at a specific geographical location based on said acquired external data and said stored coverage area data;

(g) means for selecting a mobile telephony standard; and (h) means for commencing communication using said mobile communication device according to a selected mobile telephony standard,
wherein said storing means includes storing a first table that forms a list of various mobile telephony standards according to which the mobile communication device can operate.

9. The system of claim 8, wherein said geographical area is divided into a plurality of zones including first zones and second zones of smaller areas within said first zones, said mapping means including mapping said first and second geographic zones into corresponding separate data structures.

10. The system of claim 8, wherein said storing means includes storing a second table that includes parameter values for each mobile telephony standard, enabling for configuration of transceiving circuit.

11. The system of claim 8, wherein said storing means includes transmitting new information in order to update said stored coverage area data for said mobile telephony standards.

12. The system of claim 8, wherein said acquiring means comprises an interface for obtaining signals from a satellite communication system and deriving geographical coordinates therefrom.

* * * * *